(12) United States Patent
Yamaoka et al.

(10) Patent No.: US 9,603,497 B2
(45) Date of Patent: Mar. 28, 2017

(54) HANDHELD BLOWER (71) Applicant: Chervon (HK) Limited, Wanchai (HK)

(72) Inventors: Toshinari Yamaoka, Nanjing (CN); Xiandian Shao, Nanjing (CN); Fangjie Nie, Nanjing (CN); Jianpeng Guo, Nanjing (CN)

(73) Assignee: Chevron (HK) Limited, Wanchai (HK)

( * ) Notice: Subject to any disclaimer, the term of this patent is extended or adjusted under 35 U.S.C. 154(b) by 479 days.

(21) Appl. No.: 14/034,064

(22) Filed: Sep. 23, 2013

(65) Prior Publication Data

US 2014/0234130 A1 Aug. 21, 2014

(30) Foreign Application Priority Data

Feb. 20, 2013 (CN) .......................... 2013 1 0054133
Mar. 29, 2013 (CN) .......................... 2013 1 0107859
Mar. 29, 2013 (CN) .......................... 2013 1 0110140
Mar. 29, 2013 (CN) .......................... 2013 1 0110462

(51) Int. Cl.
*A47L 5/24* (2006.01)
*E01H 1/08* (2006.01)
*A01G 1/12* (2006.01)

(52) U.S. Cl.
CPC .............. *A47L 5/24* (2013.01); *A01G 1/125* (2013.01); *E01H 1/0809* (2013.01)

(58) Field of Classification Search
CPC .......... A47L 5/24; A01G 1/123; E01H 1/0809
USPC ....................................................... 417/234
See application file for complete search history.

(56) References Cited

U.S. PATENT DOCUMENTS

| | | | | | |
|---|---|---|---|---|---|
| 4,884,314 | A | * | 12/1989 | Miner ....................... | A47L 5/14 15/344 |
| 6,158,082 | A | * | 12/2000 | Beckey ................... | A01G 1/125 15/326 |
| 2004/0197175 | A1 | * | 10/2004 | Turner ................. | H01M 2/1022 414/416.09 |
| 2008/0022481 | A1 | * | 1/2008 | Reeves ................. | E01H 1/0836 15/330 |

(Continued)

OTHER PUBLICATIONS

UC Santa Barbara Pump-House Apr. 2004 http://www.cs.cdu.edu.au/homepages/jmitroy/eng247/sect10.pdf https://web.archive.org/web/*/http://www.library.ucsb.edu:80/internal/libwaves/apr04/sea-water-pumphouse1.html.*

(Continued)

*Primary Examiner* — Patrick Hamo
(74) *Attorney, Agent, or Firm* — Greenberg Traurig, LLP (57) ABSTRACT

A handheld blower includes a housing having an air inlet and a duct assembly mounted in front of the air inlet, the duct assembly including a duct connected with the housing, a motor and a fan mounted in the duct, a battery, and a blowpipe connected to the housing by the duct assembly, the blowpipe defining a central axis in the length direction, and a handle arranged above the housing and the battery. The handle includes a gripping portion arranged on opposite sides of a plane in which the gravity center of the blower is located, and the plane is parallel to a central axis of the blowpipe and substantially perpendicular to a working ground. The gravity center of the handheld blower is adjacent to the gripping portion which enhances the handling comfort and reduces operator fatigue during long times of operation.

18 Claims, 9 Drawing Sheets

(56) References Cited

U.S. PATENT DOCUMENTS

| | | | | |
|---|---|---|---|---|
| 2009/0180902 A1* | 7/2009 | Tung | ............ | F04D 25/082 417/354 |
| 2009/0241285 A1* | 10/2009 | Hinklin | ............ | A47L 5/14 15/330 |
| 2010/0221591 A1* | 9/2010 | Ro kamp | ............ | H01M 2/1022 429/99 |
| 2011/0113592 A1* | 5/2011 | Robison | ............ | A47L 9/242 15/414 |
| 2011/0198103 A1* | 8/2011 | Suzuki | ............ | B25F 5/00 173/46 |
| 2012/0076672 A1* | 3/2012 | Binder | ............ | F04D 25/084 417/234 |

OTHER PUBLICATIONS

Canadian Intellectual Property Office, Office Action regarding CA Appl. No. 2,828,569, dated Nov. 28, 2014, 3 pgs.

* cited by examiner

HANDHELD BLOWER

RELATED APPLICATION INFORMATION

This application claims the benefit of CN 201310054133.2, filed on Feb. 20, 2013, CN 201310110462.4, filed on Mar. 29, 2013, CN 201310107859.8, filed on Mar. 29, 2013, and CN 201310110140.X, filed on Mar. 29, 2013, the disclosures of which are incorporated herein by reference in their entirety.

FIELD OF THE SUBJECT DISCLOSURE

The subject disclosure relates to electrical garden tools and, more particularly, to a handheld blower.

BACKGROUND

A garden handheld blower is mainly powered in two manners, namely, by an external power supply or a battery pack. If the external power supply is used, the machine can only be used in applications with a power interface which greatly limits the application scope of the handheld blower. While the use of a battery pack can solve this problem, in the case of the battery pack, the weight and the size of the battery pack is generally large in order to ensure endurance of the device. As the capacity of the battery pack is increased, the whole weight of the handheld blower is also increased accordingly, and then the comfort of handling is decreased gradually. Moreover, the arrangements for the members of most handheld blowers are unreasonable, which causes inflexible operation, and the operator needs to additionally provide a force to overcome the deflection of the handheld blower during operation which may cause hand pain after a long time of operation.

As for some garden handheld blowers, since the air needs to pass through the motor, the conducting wires of the motor may be fixed by two manners. In one manner, the wires are exposed in the airflow directly, thus it has a weak reliability, and the air trends to tear out the wires during a high-speed operation, so that the motor cannot be switched on. In the other manner, a fixation tool for installing the wires is arranged in the duct, which can facilitate the fixing and protection of the wires. But, due to the added members, on one hand, the cost is increased and, on the other hand, the air resistance is also increased and the blowing efficiency of the whole machine is reduced.

The garden handheld blowers are mainly used to blow fallen leaves and small garbage on the ground. In order to blow plenty of fallen leaves on the ground and some relatively heavy garbage, the blowers are generally started to operate at the maximum speed. However, most of the current garden handheld blowers need to be operated by two hands for controlling the device and also to press a boost button. Thus, the operation of such devices is inconvenient and the operator may feel tired during a long time of operation.

Additionally, it is proved by experiments that in order to blow plenty of fallen leaves on the ground or some relatively heavy garbage, a blower needs a relatively large air flow rate. As for the handheld DC blower with a battery pack mounted to the housing in the current market, the small capacity of the battery and the design limitations cause the blowing efficiency of the whole blower to be relatively low. The air flow rate of the blower is relatively small, and the working time capacity of the battery is relatively short, and thus it cannot meet the requirements of the operator.

SUMMARY

As will become apparent from the detailed description which follows, the subject handheld blower is designed to provide improved operating comfort.

In order to achieve the above objective, the subject handheld blower includes a housing having an air inlet and a duct assembly mounted in front of the air inlet, the duct assembly comprising a duct connected with the housing, a motor and a fan mounted in the duct, a battery mounted on the housing, a blowpipe connected to the housing by the duct assembly, the blowpipe defining a central axis in the length direction, and a handle arranged above the housing and the battery. The handle includes a gripping portion arranged on opposite sides of a plane in which the gravity center of the blower is located, and the plane is parallel to the central axis and substantially perpendicular to a working ground. Because the gripping portion of the handle is arranged on opposite sides of a plane in which the gravity center of the whole blower is located, the whole structure of the machine is compact, and the gravity center is adjacent to the gripping portion, which reduces the force needed by the operator for overcoming the deflection of the handheld blower during the operation, enhances the handling comfort and reduces operator fatigue during long times of gripping operation.

DETAILED DESCRIPTION

In order to better understand the technical content of the present invention, the following will describe a non-limiting description of preferred embodiments with reference to the drawings in detail.

Figure 1:
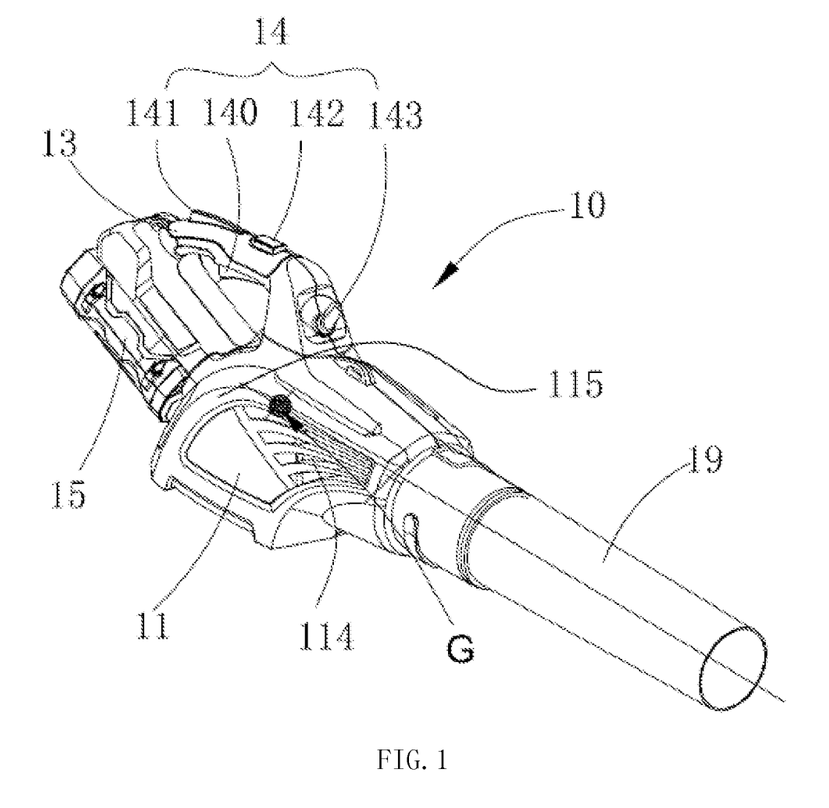
FIG. 1 is a perspective view of an exemplary handheld blower constructed according to the description which follows.
Figure 2:
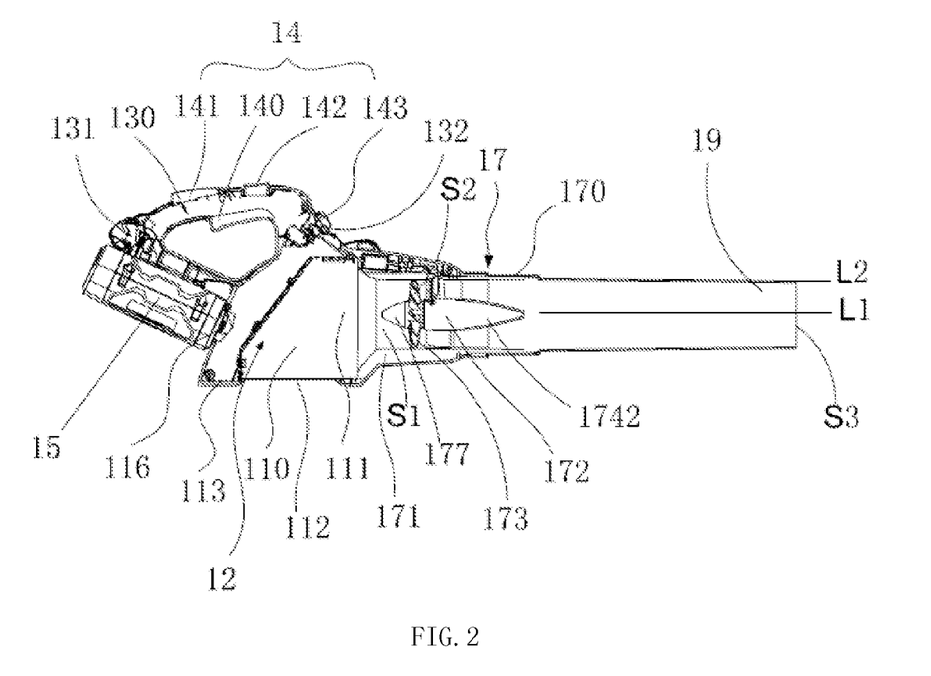
FIG. 2 is a front view of the handheld blower of FIG. 1 with the housing removed.

Referring to FIG. 1 and FIG. 2, in one embodiment of the present invention, the handheld blower 10 includes a housing 11, an air intake box 12, a handle 13, a control assembly 14, a battery 15, a duct assembly 17 and a blowpipe 19. The battery 15 and the duct assembly 17 are arranged on opposite ends of the housing 11 and the handle 13 is arranged on the housing 11. The housing 11 is connected with the blowpipe 19 by the duct assembly 17, and the air intake box 12 is arranged in the housing 11.

Figure 3:
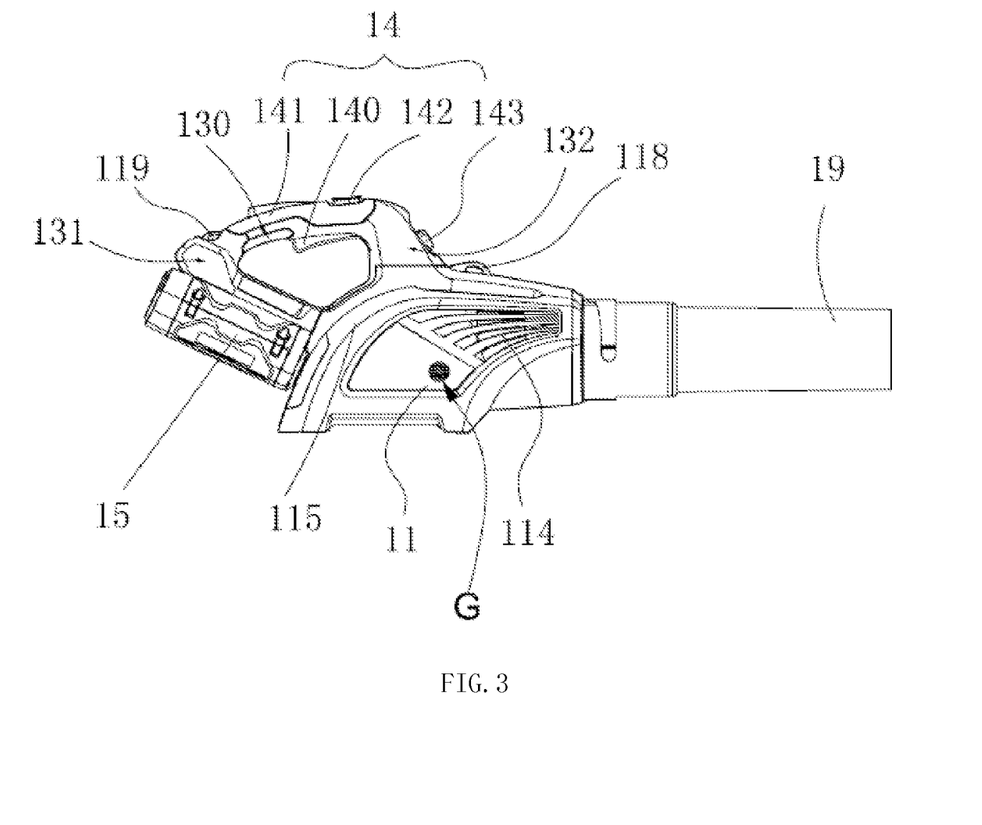
FIG. 3 is a front view of the handheld blower of FIG. 1.

Referring to FIGS. 2 and 3, the housing 11 includes an accommodating chamber 110, a mounting portion 111, a main air inlet 112, a secondary air inlet 113, a side air inlet 114 and a bending portion 115. The accommodating chamber 110 is formed in the housing 11, the air intake box 12 is mounted in the accommodating chamber 110, and one end of the duct assembly 17 is fixedly mounted in the mounting portion 111. The main air inlet 112 and the secondary air inlet 113 are arranged on the bottom of the housing 11, and the side air inlet 114 is arranged on a side wall of the housing 11. The airflow enters from the main air inlet 112 or the secondary air inlet 113, and is guided by the bending portion 115 to flow into the duct assembly 17 from the mounting portion 111. The side air inlet 114 can facilitate the entrance of the airflow and obtain a good entrance effect of the airflow. It should be noted that the side air inlet 114 may also be omitted.

Figure 5:
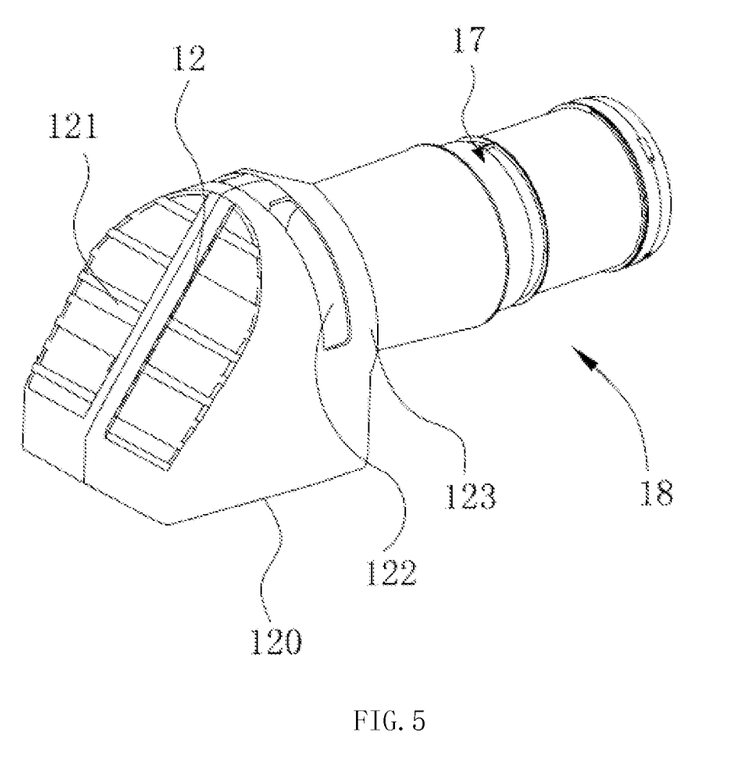
FIG. 5 is a view illustrating the connection between the air intake box and the duct assembly of the handheld blower of FIG. 1.

Referring to FIG. 5, the air intake box 12 includes a bottom air intake portion 120, a rear air intake portion 121, a side air intake portion 122 and an air outlet 123. The bottom air intake portion 120 and the rear air intake portion 121 are each configured as a grille structure, and the rear air intake portion 121 is configured as a ramp structure corresponding to the bending portion 115 of the housing 11. The air outlet 123 of the air intake box 12 is connected with an air intake end of the duct assembly 17. As such, the air intake box 12 and the duct assembly 17 may form an independent working unit 18, and the bottom air intake portion 120, the rear air intake portion 121 and the side air intake portion 122 of the air intake box 12 form a plurality of blowing passages with the air outlet 123 respectively, thus as long as the independent working unit 18 can be mounted into the housing and form the blowing passages, the machine can effect a blowing function no matter how the housing 11 changes. In this way, the shape of the handheld blower may be changed quickly without changing the inner working units. In the illustrated embodiment, the main air inlet 112 of the housing 11, the bottom air intake portion 120 and the air outlet 123 of the air intake box 12 cooperatively define a first blowing passage, the secondary air inlet 113 of the housing 11, the rear air intake portion 121 and the air outlet 123 of the air intake box 12 cooperatively define a second blowing passage, and the side air inlet 114 of the housing 11, the side air intake portion 122 and the air outlet 123 of the air intake box 12 cooperatively define a third blowing passage.

Referring to FIGS. 1, 2, 4 and 6, the handle 13 used to handle the handheld blower 10 is arranged on the bending portion 115 of the housing 11 and located above the housing 11 and the battery 15. The handle 13 includes a gripping portion 130, a battery mounting portion 131 and a speed adjusting portion 132, wherein the gripping portion 130 is arranged between the battery mounting portion 131 and the speed adjusting portion 132.

Figure 4:
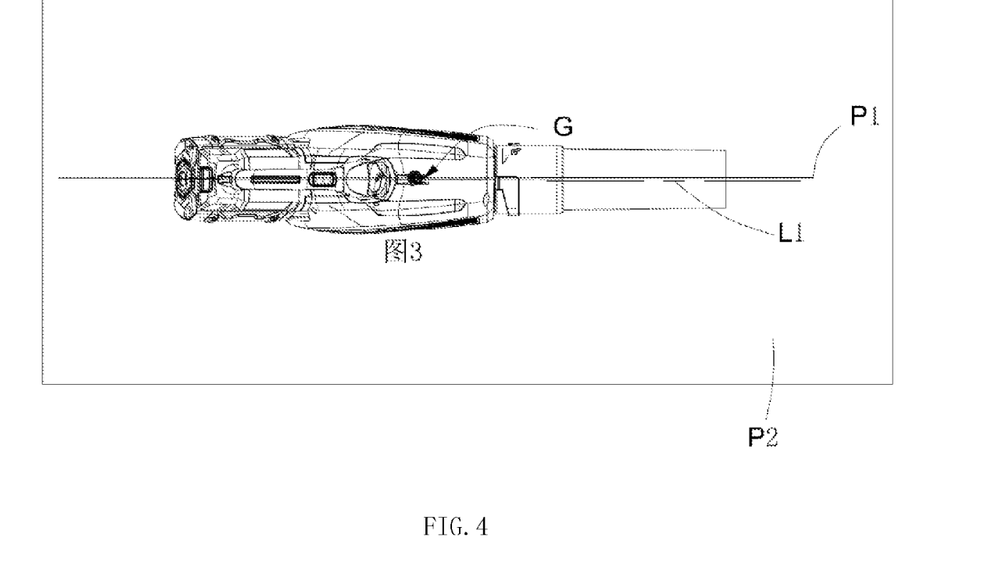
FIG. 4 is a top view of the handheld blower of FIG. 1.

In the illustrated embodiment, a central axis L1 is defined on the blowpipe 19 in the length direction. The gravity centre G of the whole blower is located in a plane P1, and the plane P1 is substantially perpendicular to the working ground P2 and parallel to the central axis L1. The housing 11, the battery 15, the duct assembly 17 and the blowpipe 19 are substantially arranged along the same line, and the gripping portion 130 of the handle 13 is arranged on opposite sides of the plane P1. Preferably, the gripping portion 130 of the handle 13 is symmetrically arranged on opposite sides of the plane P1. Thus, the machine has a compact structure, and the gravity centre is close to the gripping portion, which reduces the force needed to overcome the deflection of the handheld blower during operation, enhances the comfort of the handling of the device and reduces operator fatigue during long times of gripping operation. It should be noted that the battery may also be arranged above or below the housing 11. The housing 11, the duct assembly 17 and the blowpipe 19 are substantially arranged along the same line. The gripping portion 130 of the handle 13 is arranged on opposite sides of the plane in which the gravity center is located. The plane is parallel to the axis of the blowpipe 19 and substantially perpendicular to the working ground P2 which is defined as a horizontal plane.

Figure 6:
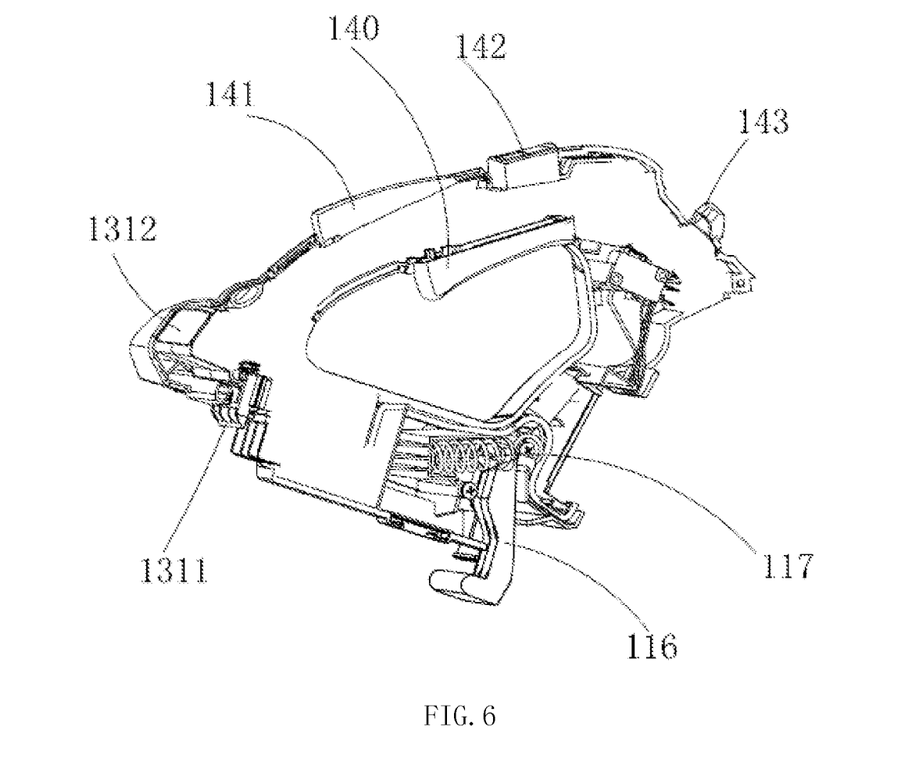
FIG. 6 is a view of the handle of the handheld blower of FIG. 1.

The control assembly 14 is used to control the switching-on or switching-off and the rotating speed of the handheld blower. The control assembly 14 includes a trigger 140 for controlling the switching-on or switching-off of the handheld blower, a locking button 141 for preventing a mistaken startup of the handheld blower, a boost button 142 for controlling the handheld blower to rotate at the maximum rotating speed and a speed adjusting button 143 for adjusting the rotating speed of the motor 172 of the handheld blower. The speed adjusting button 143 is arranged on the speed adjusting portion 132. For the sake of convenience, the trigger 140, the locking button 141 and the boost button 142 are all arranged on the gripping portion 130. With this position arrangement, the operator can press the trigger 140 while operating the boost button 142 by his thumb. Additionally, if the machine needs to be operated under high-speed blowing condition for a long time, the operator can press the boost button 142 and the locking button 141 by his palm simultaneously while handling the gripping portion 130, and can press the trigger 140 by his fingers. In this way, the handheld blower may be started by one-hand operation and continually operated at the maximum rotating speed, which reduces hand fatigue during the operation and enhances the comfort of handling the device. The locking button 141 is an assistant switch member for preventing the mistaken startup of the handheld blower. It may be appreciated that the locking button 141 may be omitted, and the operator can only use the trigger 140 and the boost button 142 to start up the handheld blower and keep a continuous operation.

The battery 15 is mounted to the housing 11 by the battery mounting portion 131, and used to provide power to the handheld blower. The housing 11 is provided with an ejecting head 116 for cooperating with the battery 15 and a battery mounting base (not shown). The ejecting head 116 is connected with a spring 117 and may rotate relative to the housing. When the battery 15 is assembled to the housing 11, the front end of the battery 15 pushes the ejecting head 116 to rotate against the elastic force of the spring 117 and deflect to a predetermined position. When the battery 15 is disassembled, the ejecting head 116 pushes the battery 15 towards the disassembling direction under the action of the spring 117.

The battery mounting portion 131 is provided with a battery latch 1311 for locking the battery 15 on the housing 11. The battery latch 1311 is further provided with a releasing button 1312 linked with it. By pressing or pushing the releasing button 1312, the battery latch 1311 is disengaged from the battery 15, and then the battery 15 may be removed conveniently under the action of the ejecting head 116. Certainly, the battery mounting portion 131 may also be arranged on the housing 11 as long as it can lock the battery 15 to the battery mounting base arranged on the housing 11 when mounting the battery 15.

Figure 7:
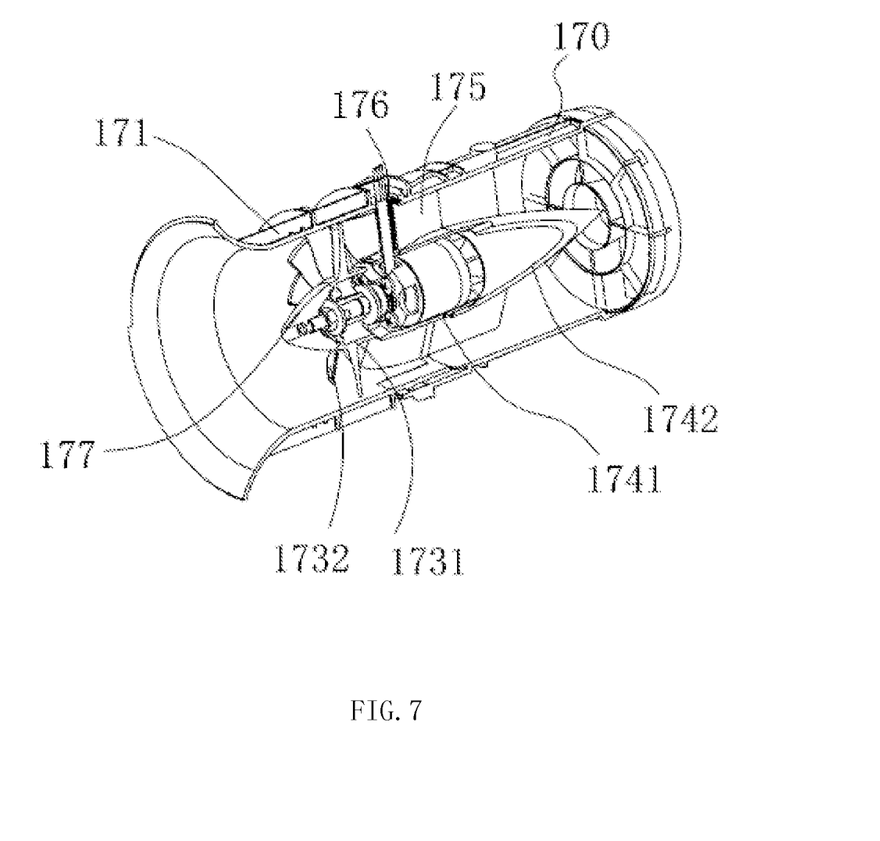
FIG. 7 is a sectional view of the duct assembly of the handheld blower of FIG. 1.
Figure 8:
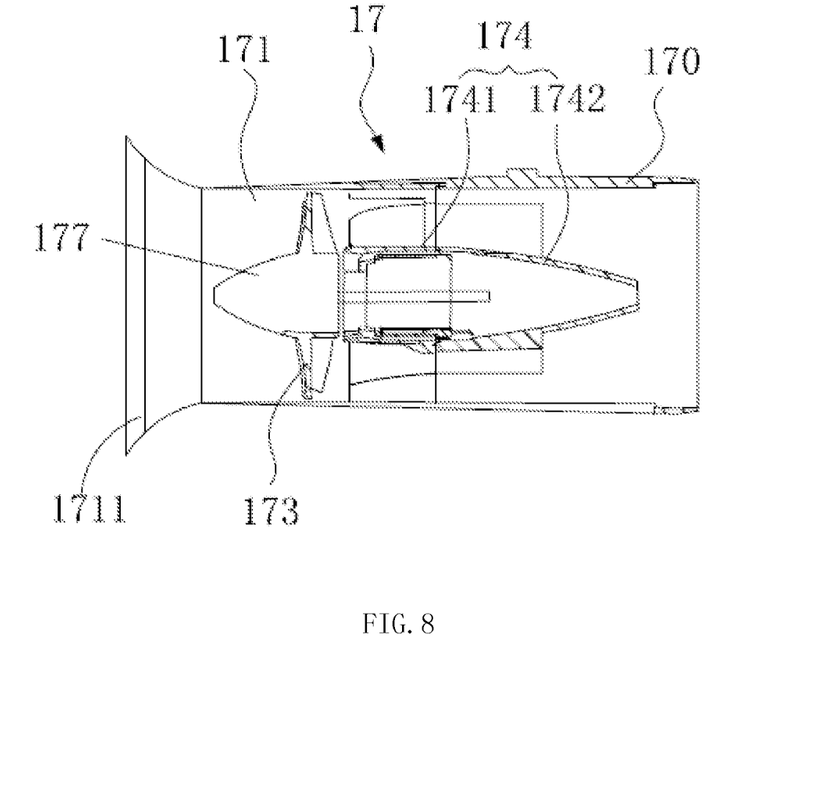
FIG. 8 is a perspective view of the duct assembly of the handheld blower of FIG. 1 with a portion of the duct and the connecting pipe removed.

Referring to FIG. 7 and FIG. 8, the duct assembly 17 includes a connecting pipe 170 connected with the blowpipe 19, a duct 171 connected to the housing 11, a motor 172 and a fan 173. The motor 172 is connected with the trigger 140 of the control assembly 14 by wires, and the connecting pipe 170 is locked with the duct 171. A supporting ring 174 for accommodating the motor 172 is arranged in the connecting pipe 170 and the duct 171. The motor 172 is mounted in the supporting ring 174 and the fan 173 is connected with the output shaft of the motor 172. A plurality of radial air guiding ribs 175 are integrally formed in the connecting pipe 170 and the duct 171. One end of each air guiding rib 175 is connected to the inner wall of the connecting pipe 170 or the duct 171, and the other end is connected to the supporting ring 174, wherein at least one air guiding rib 175 is provided with a channel 176 for the wires of the motor 172 to pass through. This arrangement not only increases the reliability of positioning the wires while reducing air resistance, it also eliminates the need of added members, thus the wires can be fixed easily, reliably and simply during assembly. It may be appreciated that if the length of the duct 171 is sufficient, the connecting pipe 170 may be omitted, and the supporting ring 174 and the air guiding ribs 175 can be directly arranged on the duct 171. The duct 171 has an air intake portion 1711 which is configured as a lip edge structure for facilitating the guidance of air in order to reduce the noise at the air intake portion 1711 of the duct. The above lip edge structure may be formed with the duct 171 in one piece or may be formed as a single member to be mounted to the duct 171.

In an embodiment of the present invention, the fan 173 is an axial fan, and the motor 172 is a brushless DC motor. The fan 173 is driven by the motor 172, and includes a hub 1731 mounted to the rotating shaft (not shown) of the motor and a plurality of blades 1732 mounted to the hub 1731. The blades 1732 and the hub 1731 may be formed in one piece or may be formed separately and then assembled together.

One end of the fan 173 adjacent to the housing 11 is provided with a fairing 177, and the other end of the fan 173 adjacent to the blowpipe 19 is connected with the motor 172. Since the fan 173 is an axial fan, after passing through the first blowing passage, the second blowing passage, the third blowing passage and entering the fan 173, the airflow axially passes through the air guiding ribs 175 under the action of the fan 173 and flows into the blowpipe 19. In an embodiment of the present invention, the supporting ring 174 includes an accommodating portion 1741 for accommodating the motor 172 and an air guiding portion 1742. The front end of the accommodating portion 1741 is provided with an opening, and the air guiding portion 1742 is a tapered structure integrally formed with the accommodating portion 1741. The air guiding portion 1742 is arranged on one end of the supporting ring 174 adjacent to the blowpipe 19 and has a plurality of air intakes for the cooling airflows to pass through. During the blowing process, since the air pressure around the motor 172 is larger than that around the fan 173, a secondary airflow is generated under the action of pressure differential. The secondary airflow passes through the air intakes of the air guiding portion 1742 and flows into the supporting ring 174 to cool the interior of the motor 172, and finally flows out from the opening on the front end of the accommodating portion 1741, thus the motor 172 may be cooled during the blowing process.

Still referring to FIG. 3, in order to facilitate the carrying of the machine, the handheld blower of the present invention further includes a strap with two ends connected to two hanging holes 118, 119 on the housing 11 respectively. The two hanging holes 118, 119 have the same distance from the center of the gripping portion 130, and the center point of the connecting line between the positions of the two hanging holes 118, 119 is located around the gravity center line of the whole machine.

The handheld DC blower is mainly used to blow fallen leaves and small garbage on the ground. It is proved by research that, in order to blow plenty of fallen leaves on the ground or some garbage, the air flow rate of the handheld blower generally needs to be larger than 395 cfm. The handheld DC blower in the current market with a battery pack mounted on the housing has a small battery capacity and a relatively low blowing efficiency, and thus cannot meet the requirement that the air flow rate is larger than 395 cfm and the working time is more than 5 min. Thus, in order to obtain relatively large air flow rate and relatively high blowing efficiency, it is required to optimize the battery capacity, the brushless DC motor, the parameters of the axial fan and the air passage design.

In order to obtain the desired air flow rate and working time, the capacity of the battery is generally larger than 170 wh. Generally, the capacity of the battery is proportional to the weight itself. As for the handheld blower, due to the requirement for the weight of the whole machine, the capacity of the battery pack is preferably in the range from 170 wh to 400 wh. On one hand, if the capacity of the battery pack is too small, the machine cannot meet the requirement for the air flow rate and the working time; on the other hand, if the capacity of the battery pack is too large, the tiredness during the operation may be increased, which is not convenient for a long time operation.

Table 1 lists the effective working time of the handheld blower operated at the maximum air flow rate and the minimum air flow rate when the capacity of the battery is 200 wh and 300 wh. It can be seen from table 1 that if the capacity of the battery is constant, the air flow rate is inversely proportional to the working time, that is to say, the larger the air flow rate is, the shorter the working time will be. In accordance with the human engineering, through a number of simulation experiment analysis for the weight of the whole machine and the bearing degree of people, it can be determined that the performance parameters of the handheld blower suitable for most operators are as follows: the air flow rate is in the range from 385 cfm to 700 cfm and the working time is in the range from 20 min to 75 min.

TABLE 1

| Capacity of the battery | Maximum air flow rate | Minimum air flow rate |
|---|---|---|
| 200 wh | 36 min | 120 min |
| 300 wh | 54 min | 180 min |

If the capacity of the battery is constant, in order to obtain a handheld DC handheld blower with an air flow rate larger than 395 cfm and higher blowing efficiency, it is required to optimize the brushless DC motor, the parameters of the axial fan and the air passage design.

Referring to FIGS. 7 and 8 again, the motor 172 is accommodated into the supporting ring 174 arranged in the duct 171 and the connecting pipe 170, and the hub 1731 of the axial fan 173 is mounted to the rotating shaft of the motor 172. In accordance with the principle of aerodynamics, in order to reduce the air resistance and increase the air speed, the contours of the fairing 177, the hub 1731 and the supporting ring 174 are designed using a streamlined shape, thus the diameter of the motor 172 may define the diameter of the hub 1731. In addition, when designing the axial fan, the ratio of the root diameter to the top diameter of the blade, i.e., the ratio of the diameter of the hub of the fan to the outer diameter of the blade, hereinafter referred to as hub ratio, is an important parameter. With the same outer diameter of the blade and the hub, the smaller hub and the longer blades are more suitable for the axial flow blower having low pressure and high flow rate. It is proved by simulation analysis that the blowing efficiency of the blades is relatively high when the hub ratio is in the range from 0.25 to 0.45. Thus, if the diameter of the motor is relatively large, the diameter of the hub would be relatively large accordingly. In order to set the parameter of the hub ratio in the optimal scope so as to obtain a higher blowing efficiency, the diameter of the blade would be increased accordingly, and thus the volume of the duct is increased and the volume of the whole machine is increased. As a result, both the shape design and the operating comfort during the actual operation will be affected adversely. Thus, the diameter of the motor is preferably no larger than 35 mm. In this way, the whole machine is light in weight and occupies a smaller space.

Figure 9:
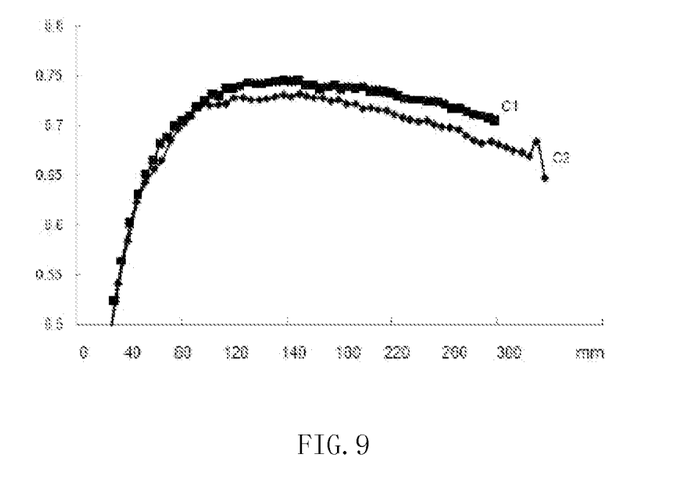
FIG. 9 illustrates the curve of the functional relationship between the outer diameter of the blade of the fan and the blowing efficiency of the handheld blower of FIG. 1.

In accordance with the scope of the hub ratio, it can be further concluded that the scope of the outer diameter of the blade is in the range from 78 mm to 140 mm, thus the blowing efficiency is higher. As shown in FIG. 9, C1 and C2 are curves illustrating the functional relationship between the outer diameter of the blade and the blowing efficiency, which is obtained by simulation modeling and analysis when the air flow rate is 560 cfm and 500 cfm respectively. It can be seen from FIG. 9 that the best blowing efficiency is obtained when the outer diameter of the blade is in the range from 85 mm to 140 mm. The blowing efficiency herein is defined as the ratio of the work caused by the flow of the airflow to the work consumed by the rotation of the blades of the fan.

Further, as the diameter of the motor is smaller than 35 mm and the ratio of the air flow rate to the diameter of the motor is larger than 12 cfm/mm, the handheld blower of the present invention can obtain higher blowing efficiency with a small motor as compared with the common handheld blower.

The following will describe the air passage design of the present invention in detail. Referring to FIG. 2 again, along the direction of the axis L1, the flow cross-section S1 of the air passage at the rear end of the fan 173 adjacent to the air inlet 112 is larger than the flow cross-section S3 at the air outlet 191 of the blowpipe 19, and a circular flow-through area is formed between the inner wall of the duct 171 and the hub 1731 of the fan. The ratio of the area of the flow cross-section S3 of the air outlet 191 of the blowpipe 19 relative to the area of the flow cross-section S2 of the circular flow-through area at the position of the axial fan 173 is preferably greater than or equal to 0.8. This arrangement can effectively improve the flow characteristic of the airflow, and enhance the blowing efficiency. Meanwhile, the air passage between the fan 173 and the air outlet 191 defines an outer contour line L2 having an angle relative to the axis L1. Preferably, the angle between the axis L1 and the outer contour line L2 is smaller than 8°. That is because a large angle can cause a certain air resistance against the airflow, so that the loss of the airflow in the wall of the air passage is increased and the loss of the high-speed airflow in the blowpipe 19 is also increased, which causes the reduction of the blowing efficiency of the whole machine. With the optimization for the above two parameters, a desired flow of airflow may be obtained, while a relative small pressure loss is obtained in the blowpipe 19, which can effectively improve the blowing efficiency.

In order to obtain a sufficient air flow rate at the air outlet 191, after being calculated by CFD (Computational Fluid Dynamics) and test data, it is common to design a relatively large area of the air outlet. Preferably, the area of the cross-section of the air outlet 191 is configured to be larger than 4300 mm$^2$. Certainly, the air speed will reduce as the blowing area increases, thus the area of the air outlet is preferably in the range from 4300 mm$^2$ to 8000 mm$^2$ according to the actual operation.

By optimizing the capacity of the battery, the brushless DC motor and the parameters used in the design of the axial fan and improving the air passage design, when the capacity of the battery is in the range from 170 wh to 400 wh, the air flow rate of the handheld blower may be larger than 395 cfm, and the working time may be larger than 5 min, especially when the air flow rate is in the range from 430 cfm to 700 cfm. Meanwhile, it is also ensured that the ratio of the air flow rate to the input power is larger than or equal to 0.7 cfm/w when the blower is operated at the maximum air flow rate, thus the blowing efficiency can be improved significantly.

Although the above embodiments have disclosed the present invention, they are not intended to limit the invention. Various changes and modifications will occur to a person skilled in the art without departing the spirit and scope of the present invention. Thus, the protection scope of the invention shall be determined by the attached claims.

What is claimed is:

1. A handheld blower, comprising:
   a housing having an air inlet and a duct assembly mounted in front of the air inlet, the duct assembly comprising a duct connected with the housing, a motor and a fan mounted in the duct;
   a battery mounted on the housing providing power to the motor;
   a blowpipe connected to the housing by the duct assembly, the blowpipe defining a central axis in the length direction; and
   a handle arranged above the housing and the battery, the handle comprising a gripping portion arranged on opposite sides of a plane in which the gravity center of the whole blower is located, the plane being parallel to a central axis defined on the blowpipe and substantially perpendicular to a working ground;
   the housing having an accommodating chamber and a bending portion for turning airflow, the handle arranged on the bending portion of the housing; and
   the handle comprising a battery mounting portion on which a battery mounting assembly is provided for installing or uninstalling the battery, the battery having a first end positioned adjacent to the housing and a second end opposite to the first end, wherein the second end is higher than the first end in a vertical direction orthogonal to the central axis within the plane,
   the duct further comprising a supporting ring for accommodating the motor, and a plurality of radial air guiding ribs arranged between the duct and the supporting ring, and at least one of the air guiding ribs defines a channel for wires coupled to the motor to pass therethrough.

2. The handheld blower according to claim 1, wherein the gripping portion is symmetrically arranged on opposite sides of the plane and the housing, the duct assembly and the blowpipe are substantially arranged along a same line.

3. The handheld blower according to claim 2, wherein the air inlet comprises a main air inlet, a secondary air inlet and a side air inlet, the main air inlet and the secondary air inlet are arranged on the bottom of the housing, and the side air inlet is arranged on the side wall of the housing.

4. The handheld blower according to claim 3, further comprising an air intake box arranged in the accommodating chamber of the housing, the air intake box being connected with the duct assembly to form an independent working unit, the air intake box comprising a bottom air intake portion, a rear air intake portion, a side air intake portion and an air outlet, the bottom air intake portion and the side air intake portion each being configured as a grille structure, the rear air intake portion including an inclined surface corresponding to the bending portion of the housing, the main air inlet of the housing, the bottom air intake portion and the air outlet cooperatively defining a first blowing passage, the secondary air inlet of the housing, the rear air intake portion and the air outlet cooperatively defining a second blowing passage, and the side air inlet of the housing, the side air intake portion and the air outlet cooperatively defining a third blowing passage.

5. The handheld blower according to claim 1, wherein the housing defines two hanging holes having generally the same distance from the center of the handle, and the handheld blower further comprises a strap with two ends connected into the two hanging holes respectively.

6. The handheld blower according to claim 1, wherein the duct assembly further comprises a connecting pipe for locking with the duct, the connecting pipe is connected with the blowpipe, the air guiding ribs are partially extending between the connecting pipe and the supporting ring, and each of the air guiding ribs has one end connected to the inner wall of the connecting pipe or the duct and the other end connected to the supporting ring.

7. The handheld blower according to claim 6, wherein the supporting ring comprises an accommodating portion for accommodating the motor and an air guiding portion, the air guiding portion is a substantially tapered structure and formed with the accommodating portion in one piece, the air guiding portion is arranged on one end of the supporting ring adjacent to the blowpipe, a front end of the accommodating portion defines an opening, and the air guiding portion defines a plurality of air intakes.

8. The handheld blower according to claim 1, wherein the fan comprises a hub mounted to a rotating shaft of the motor and a plurality of blades mounted to the hub, wherein a fairing is provided on one end of the fan adjacent to the housing and the motor is connected with the other end of the fan adjacent to the blowpipe.

9. The handheld blower according to claim 1, wherein the handheld blower further comprises a control assembly having a boost button for controlling the blower to rotate at the maximum rotating speed, a speed adjusting button for adjusting the rotating speed of the blower and a trigger for controlling the switching-on/switching-off of the blower, the boost button, the speed adjusting button and the trigger being arranged on the gripping portion respectively.

10. The handheld blower according to claim 9, wherein the handle comprises a speed adjusting portion arranged adjacent to the gripping portion and the speed adjusting button is arranged on the speed adjusting portion.

11. The handheld blower according to claim 1, wherein the battery has a capacity in the range from 170 wh to 400 wh.

12. The handheld blower according to claim 1, wherein the battery mounting assembly comprises a battery latch, a releasing button linked with the battery latch, and an ejecting head arranged on the housing, the releasing button being configured to disengage the battery latch from the battery, and the ejecting head being connected with an elastic member and being rotatable relative to the housing.

13. The handheld blower according to claim 1, wherein the fan is an axial fan having an outer diameter in the range from 85 mm to 140 mm.

14. The handheld blower according to claim 1, wherein the motor is a brushless DC motor having a diameter less than or equal to 35 mm, and the ratio of the air flow rate of the handheld blower to the diameter of the brushless DC motor is larger than 12 cfm/mm.

15. The handheld blower according to claim 1, wherein along the direction of the central axis of the blowpipe, an area of a flow cross-section of an air passage at a rear end of the fan adjacent to the air inlet is larger than that of a flow cross-section at an air outlet of the blowpipe, and a flow-through area is formed between the inner wall of the housing and the hub of the fan, and wherein the ratio between the area of the flowing cross-section of the air outlet of the blowpipe and the area of the flow cross-section of the flow-through area at the position of the fan is greater than or equal to 0.8.

16. The handheld blower according to claim 1, wherein an air passage between the fan and the air outlet defines an outer contour line, the outer contour line and the central axis cooperatively define an angle less than or equal to 8°, and the area of the cross-section of the air outlet of the blowpipe is greater than 4300 mm².

17. The handheld blower according to claim 1, wherein the handheld blower has an air flow rate in the range from 430 cfm to 700 cfm and a working time longer than 5 min.

18. The handheld blower according to claim 1, wherein the ratio of the air flow rate to the input power is larger than or equal to 0.7 cfm/w when the handheld blower is operated at the maximum air flow rate.

\* \* \* \* \*

UNITED STATES PATENT AND TRADEMARK OFFICE
CERTIFICATE OF CORRECTION

PATENT NO. : 9,603,497 B2
APPLICATION NO. : 14/034064
DATED : March 28, 2017
INVENTOR(S) : Toshinari Yamaoka et al.

It is certified that error appears in the above-identified patent and that said Letters Patent is hereby corrected as shown below:

On the Title Page (73) Assignee: [Chevron] should be "Chervon"

Signed and Sealed this
Ninth Day of July, 2024

Katherine Kelly Vidal
*Director of the United States Patent and Trademark Office*